United States Patent [19]

Purdy

[11] Patent Number: 5,218,388
[45] Date of Patent: Jun. 8, 1993

[54] FILM MONITOR FOR USE IN AUTOMATING MOVIE THEATER OPERATION

[76] Inventor: William H. Purdy, 3283 Conkling Pl. W., Seattle, Wash. 98119

[21] Appl. No.: 719,192

[22] Filed: Jun. 21, 1991

[51] Int. Cl.$^5$ ............................................. G03B 21/50
[52] U.S. Cl. ......................................... 352/92; 352/7; 352/236
[58] Field of Search ............................. 352/92, 236, 7

[56] References Cited

U.S. PATENT DOCUMENTS

| 1,944,024 | 1/1934 | Foster et al. | 352/92 |
| 2,477,099 | 7/1949 | Thompson et al. | 352/92 |
| 2,674,009 | 4/1954 | Williams | 352/92 |
| 3,639,046 | 2/1972 | Boudouris et al. | 352/92 |

Primary Examiner—Monroe H. Hayes
Attorney, Agent, or Firm—David L. Garrison

[57] ABSTRACT

A motion picture film monitor structured and operated in the film path of a film projector, having a plurality of film support rollers for supporting the film as it passes adjacent a plurality of sensors. The plurality of sensors includes at least one proximity sensor positioned preferably adjacent one of the guide rollers and when more than one proximity sensor is spaced closely to each other, a different frequency is used by each proximity sensor. In addition, an optical film presence detector including a light emitter and a light sensor is positioned adjacent another support roller such that when the film passes the film presence detector, it is supported by the roller. A film motion detector using a similar optical system is positioned adjacent one of the support rollers which supports the film in close proximity to the sensor. Electronic circuitry and connections therefore, are structured to allow for a logically configured and miniaturized monitor. An electronic circuit may be used to expand the control capabilities of the monitor.

17 Claims, 4 Drawing Sheets

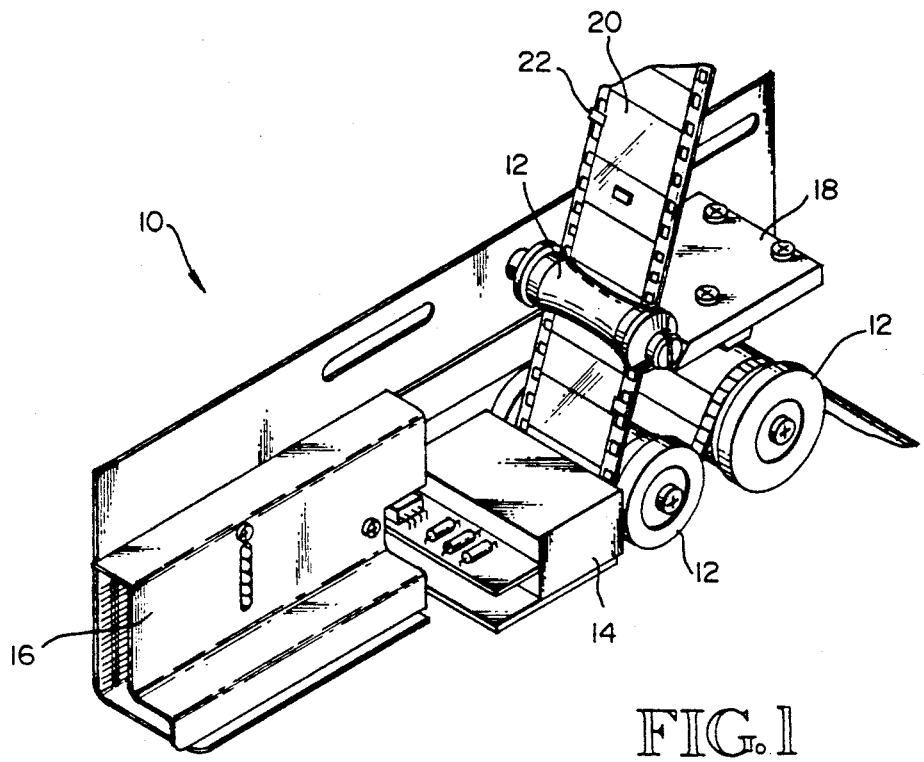
FIG.1
FIG.2
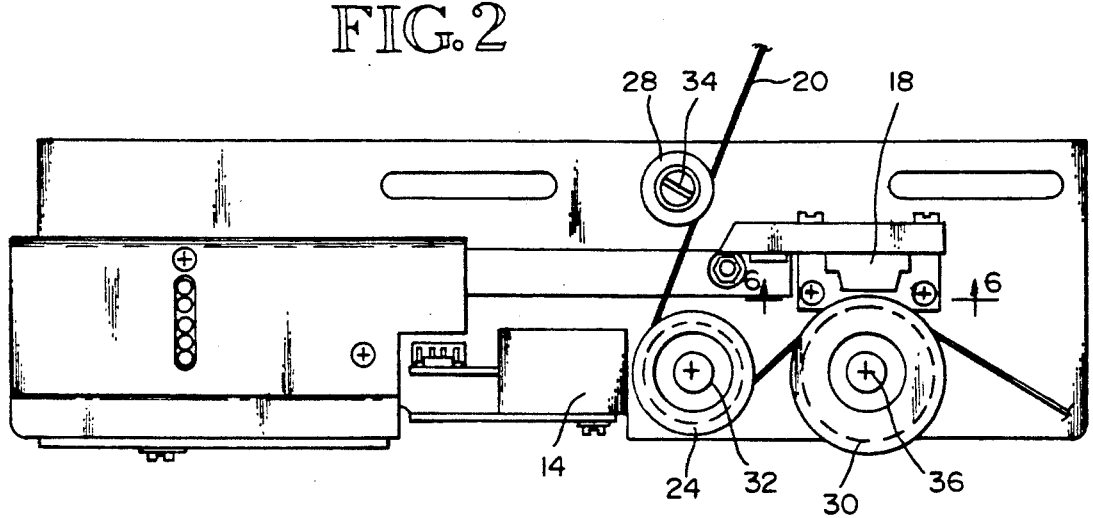

FILM MONITOR FOR USE IN AUTOMATING MOVIE THEATER OPERATION

TECHNICAL FIELD

The present invention pertains to motion picture film projector monitoring equipment and more particularly to a monitor which is characterized as having a cue sensor, a film presence sensor and a film motion sensor that collectively provide input signals to a control circuit which in turn produces output signals for use in automating a movie theater.

BACKGROUND ART

Most modern theaters use projection systems which are operated by, or at least monitored by, some form of automated control system. One aspect of such a system is a means by which the monitor senses cues that a theater operator has placed on a film being shown such that peripheral equipment is properly turned on and off at the proper time and in the proper sequence. One method of detecting the cues is to simply have a pair of rollers with the electrical connection between the rollers made by a metallic strip placed on the film, i.e., the cue. This allows the use of a method involving the use of proximity sensors. One of the most successful proximity sensors involves the use of eddy current killed oscillation (ECKO) type proximity sensors. This type of sensor changes electrical state when a piece of metal passes relatively near a sensitive area, with no physical contact being required. Theaters typically use a cue which takes the form of an adhesive backed aluminum foil patch placed directly on the movie film. In addition to cue detection, film cue detectors normally include a pair of rollers which ride on opposite edges of the film so that if the film breaks, one or both of the rollers will drop, thereby tripping a cut-off switch.

Different movie theaters use different locations for placing cues on the film, i.e., the right or left edge or in the middle, between frames.

The proximity sensor must be positioned such that the metallic cue passes in close proximity to the sensor. This necessitates that the sensor be placed not only closely adjacent to the film's surface, but also transversely across the film depending on where the cue has been placed. This creates an inventory and production problem in producing a cue detector that would function properly independent of where the cues have been placed on the film. More recently, it has been desirable to have the cue detector perform additional functions in terms of automating the theater, such as operating house lights, audio equipment and the like. Hence, it is desirable to be able to use closely spaced proximity sensors operating simultaneously to detect cues placed on the left edge, right edge, and at other locations transversely across the film such as in the space between the individual picture frames. This desire in turn created a problem because conventional ECKO type proximity sensors cannot be placed directly adjacent to each other since their electrical fields would interfere with each other causing one or both sensors to malfunction.

As a safety feature, the film break detection switches, which in the past have been rollers riding on the film, ensure that film is still in the projector and has not broken or split. A roller type switch must be in physical contact with the film and can thereby damage it or become inoperable due to dirt, wear or corrosion.

It has also been deemed desirable to have a detector which would determine whether the film in the projector is moving or stationary. Another complication is that some projectors are capable of handling both 70 mm and 35 mm movie film.

DISCLOSURE OF THE INVENTION

A film monitor structured and operated according to the present invention is adapted to be mounted in the film path of a motion picture film projector. The film monitor is basically characterized by a film support roller, which provides a stable base for motion picture film as it passes the sensors. A plurality of proximity sensors are positioned adjacent the film support roller with each sensor capable of detecting a cue independent of the operational state of adjacent sensors.

An optical film presence sensor is positioned adjacent the film support roller such that when film passes the film presence sensor, it is supported by the film support roller its presence detected by the sensor. A film motion sensor of an optical type is positioned adjacent one of the rollers which supports the film as it passes the motion sensor so that the sensor can reliably detect motion of the passing film. Connected to all of the sensors is an electronic circuit for processing the electrical signals produced by the sensors and which in turn produces a series of electrical output signals which relate to the input signals and are used for controlling the projector and peripheral equipment.

In preferred form, each of said proximity sensors is of the ECKO type which experience a change of state when a piece of metal passes in close proximity to the sensor. The plurality of sensors are placed in a substantially common plane, with each sensor having a different operating frequency than adjacent sensors, preventing electrical disturbances between adjacent sensors.

In a preferred embodiment, the film presence sensor includes an optical instrument having a light source and a light receiver such that when film is positioned between the presence sensor and a support roller, the light that is emitted from the light source is reflected by the film and then received by the light receiver which in turn produces a signal indicating that film is present. When there is no film present, insufficient light is reflected back to the light receiver to activate it, since the roller has a substantially non-reflective surface.

In another preferred embodiment, a film motion sensor includes a light emitter and a light sensor. Both the light emitter and the light sensor are positioned above perforations that are adjacent the film's edges. When the film is moving, light emitted from the light source is alternately reflected by the film and passes through the perforations in the film such that the light receiver alternately receives reflected light and substantially no reflected light, thereby creating a generally pulsed signal which is interpreted to indicate film motion. By use of three proximity sensors and different combinations of cue placement and multiple placement in transverse relationship, an eight bit binary code can be produced.

These and other features and a more complete understanding of the aspects of this invention will be apparent from the following detailed description which, taken in conjunction with the drawings, represents a preferred embodiment of this invention.

BRIEF DESCRIPTION OF THE DRAWINGS

In the drawings, unless otherwise noted, like reference characters designate like parts throughout the several views, and:

FIG. 1 is a pictorial view in perspective showing a film monitor with a piece of film passing over guide rollers and positioned between a plurality of sensors and their respective guide rollers;

FIG. 2 is a front elevational view showing a preferred embodiment having a guide roller, a cue sensor roller and a motion and film presence sensor roller;

BEST MODE FOR CARRYING OUT THE INVENTION

Figure 3:
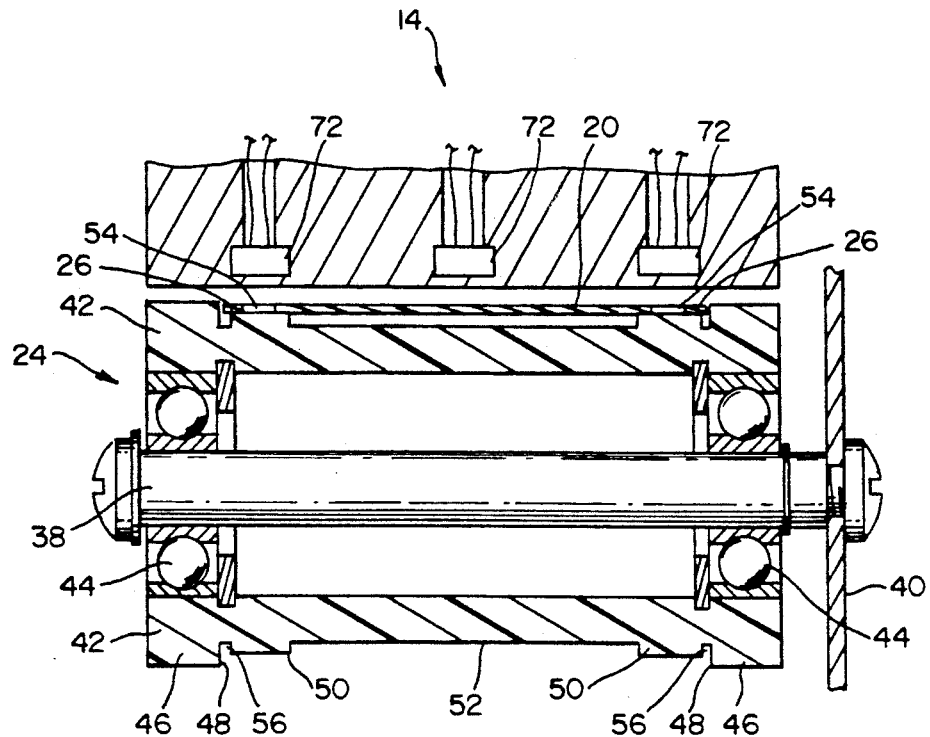
FIG. 3 is an enlarged sectional view showing the cue sensor roller, a plurality of proximity sensors and a portion of movie film.

Referring now to the drawings, and first to FIG. 1, a film monitor 10 is shown which comprises a plurality of film support guide rollers 12, a proximity sensor assembly 14, an electronic circuit 16 and a plurality of optical sensors 18.

A motion picture film 20, is threaded through the film monitor 10, as shown in FIG. 1. The film 20 is supported by a guide roller 12 as the film 20 pass(R)s adjacent sensors 14, 18. The film 20 has placed thereon one or more cues 22, which when sensed by proximity sensor 14 produce an electrical signal for use in automating the motion picture presentation. Cues 22 are typically made from a metallic material, and preferably are an adhesive backed aluminum foil about 3/16 to ¼ inch square.

As best shown in FIG. 2, the film 20 is supported by proximity sensor roller 24 adjacent to proximity sensor 14 and preferably contacts only an edge portion 26 of film 20 (as shown in FIG. 3). In order to guide film 20 onto guide 24 a first film contacting roller 28 is used to steady the film 20 as it enters the film monitor 10. An optical guide sensor roller 30 supports film 20 at a position adjacent to sensor 18. Each guide roller 24, 28 and 30 has a rotational axis 32, 34 and 36 respectively, with each rotational axis being substantially parallel to each of the others, thereby, the guide rollers 24, 28 and 30 support film 20 in a film transport plane (not shown), which is generally perpendicular to the rotational axis 32, 34 and 36.

Referring now to FIG. 3, roller 24 is supported by a cantilevered axle 38, which in turn is supported by a frame member 40. Roller 24 includes a drum-like portion 42, which is rotatably connected to said axle shaft 38 by a set of bearings 44 which in preferred form are ball-bearings. Since roller 28 is a film positioning roller, it is not supported by ball-bearings. Drum portion 42 includes a pair of outer shoulder portions 46 which include inner edge faces 48 directed toward each other and may contact film edge portions 26 in order to keep the film 20 centered on roller 24. Drum portion 42 includes a pair of film support ridges 50, which are located adjacent to inner edges 48. A reduced diameter portion 52 of drum 42 separates ridges 50. Therefore, ridges 50 are the only portion of roller 24 which are continuously in contact with film 20. This contact occurs adjacent the films edge portions 26 in the are of perforations 54 in film 20. Reduced diameter portion 52 thereby prevents roller 24 from contacting the picture image or sound track portion of film 20 thereby reducing the risk of scratching the film 20. Roller 24 also includes a pair of dirt collection grooves 56 located between edge portion 48 and ridge 50. The dirt collection grooves 56 allow any foreign matter that may come off the edge portions 26 of film 20 to collect therein and help prevent film edge portions 26 from rising above edge portions 48.

Figure 6:
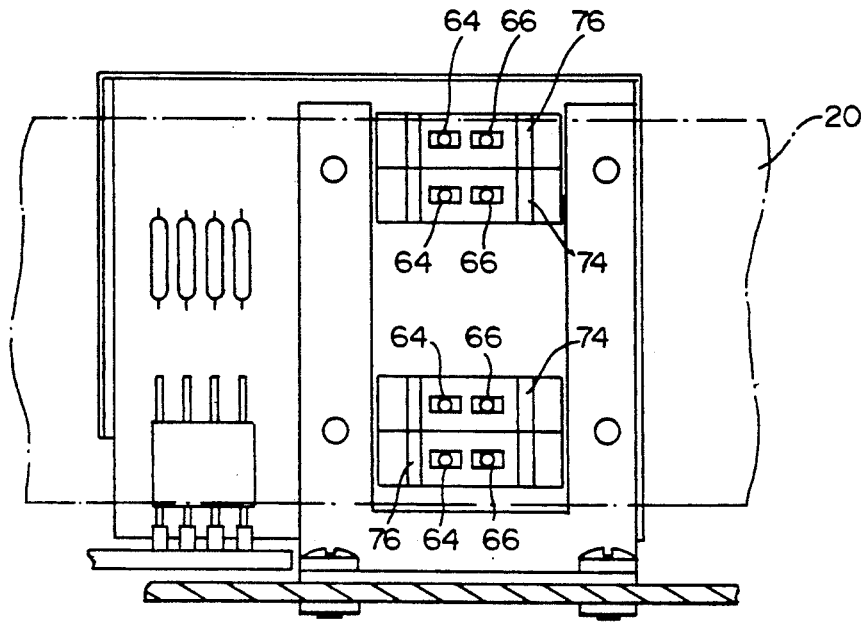
FIG. 6 is an enlarged view showing a pair of optical sensors for film presence detection and a pair of optical sensors for sensing motion of the movie film.
Figure 7:
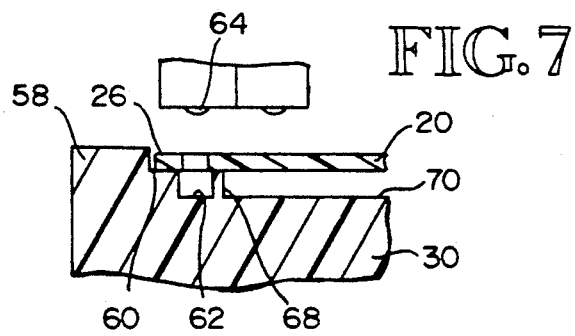
FIG. 7 is an, enlarged fragmentary sectional view showing a portion of the motion sensing roller and a portion of the optical sensor for motion detection and film presence detection.

Referring now to FIGS. 2 and 7, optical sensor roller 30 is supported in a similar manner as that of roller 24 as described above. Optical sensing roller 30 includes a pair of transversely extending shoulders 58 which guide edge portion 26 of film 20. A pair of film supporting surfaces 60 are positioned inwardly adjacent shoulders 58. A groove 62 located below film perforations 54 in order to prevent light emitted from a light source 64, which is preferably a light emitting diode, from being reflected back to a light sensor 66 (see FIG. 6) or when no film is present. An inner film support ridge 68 is located on the opposite side of groove 62 from shoulder 60 and has substantially the same diameter as shoulder 60. Hence, film support ridge 68 supports film 20 on the inside portion of the film adjacent to perforations 54. Roller 30 has a reduced diameter portion 70, located generally below the image and sound track portion of film 20 to help prevent contact with film 20 and thereby reduce the chance of scratching film 20.

Figure 4:
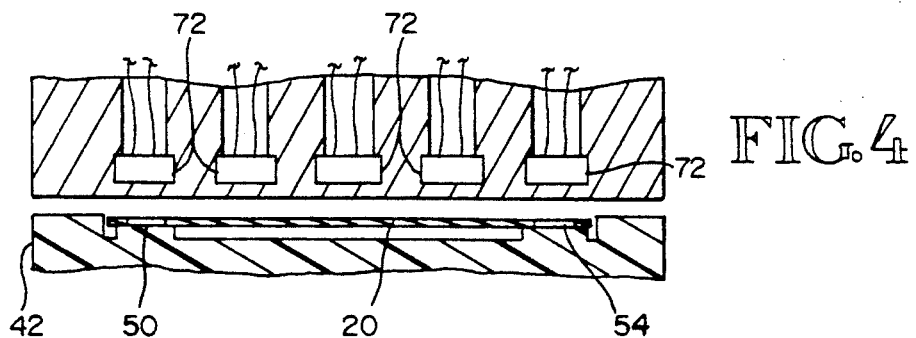
FIG. 4 is a view like FIG. 3, showing a second preferred embodiment for use with 35 mm or 70 mm film.

Referring now to FIG. 3, proximity sensor assembly 14 contains three discrete sensing elements 72 which are of the eddy current killed oscillation (ECKO) type. Each of the sensing elements 72 is placed in a substantially common plane with each sensor having an operating frequency that is different from that of an adjacent sensing element 72, such that adjacent sensing elements 72 do not cause electrical interference in an adjacent sensing element 72. In a second embodiment, as shown in FIG. 4, five sensing elements 72 are placed within proximity sensor assembly 14. This embodiment is used with 70 mm movie film as well as 35 mm movie film. When applied to 70 mm film, the center and outer sensing elements 72 are used and when 35 mm film is used, the center and inner sensing elements 72 are used.

Figure 5:
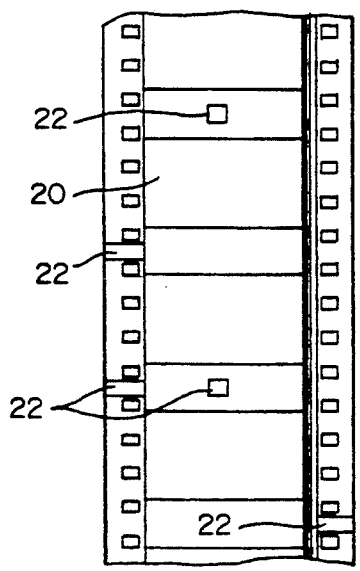
FIG. 5 shows a portion of film with metallic foil cues shown in varying positions.

FIG. 5 shows a portion of the film 20 with cues 22 placed thereon. As shown, a single cue 22 may be placed on the left, center, or right edge of the film, thereby giving a potential for three separate signals. As shown in FIG. 5, two or three cues 22 may be placed adjacent one another, providing additional output signals. By use of the three placements and variations of number of cues 22 in each placement, eight different signals, including zero, can be achieved by the present invention, as discussed in detail below.

In the event of splitting of film 20, the projector needs to be turned off. Referring to FIG. 6, optical sensor 18 includes a pair of film presence detector 74 and a pair of film motion detector 76. Each detector 74, 76, in preferred form, includes a pair of sensors, one on each edge portion of film 20. Using a pair of sensors 74, 76, is desirable because occasionally the film 20 will split in half with half of the film moving out of the film path while the other half of the film 20 remains in the film path. Each optical detector 74, 76 includes a light emitting source 64, which is preferably a light emitting diode and a light receiving photo transistor or the like 66 which senses light reflected off film 20. Since roller 30 is made of a substantially non-reflective material, such as being colored black, when no film is present, minimal light is reflected back into light sensors 66, thereby providing a signal that there is no film in the film path. Once film 20 is positioned within the film path, light from light source 64 is reflected off of the film 20 and sensed by light sensor 66, thereby producing a signal indicating the presence of film. Motion detector 76 has light intermittently reflected by the portion of film 20 between the film perforations 54; this provides an interrupted electrical output which can be monitored for indication of the motion of film 20 along the film path.

Figure 8:
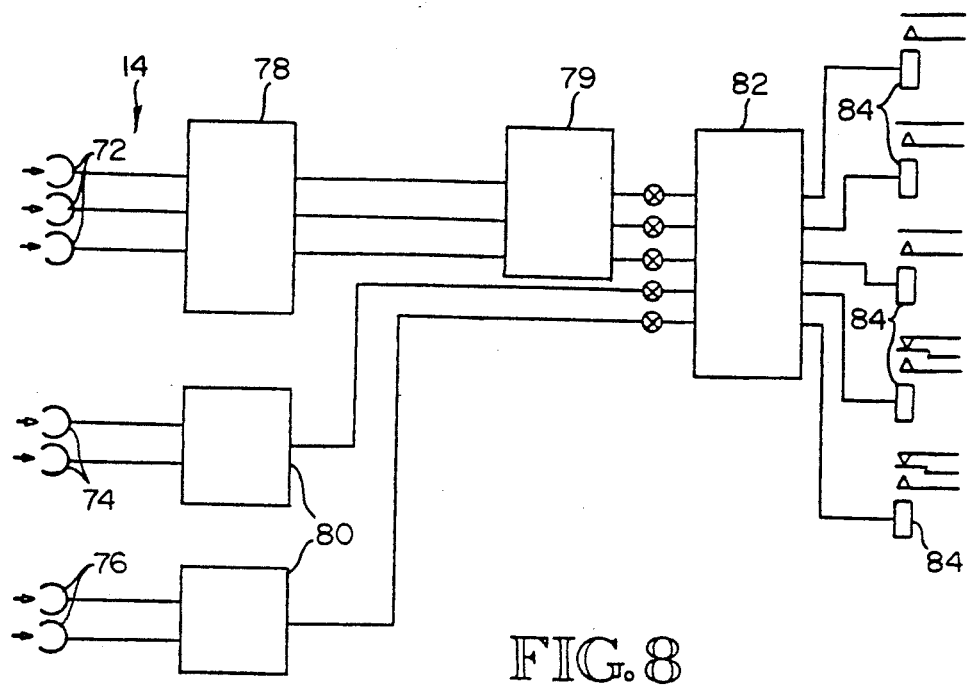
FIG. 8 is an electrical schematic representation of a preferred embodiment of the film monitor.

FIG. 8 is a diagrammatic view of the invention showing the path of electrical signals. Sensing elements 72 have a change in electrical property when a metallic object passes adjacent thereto, which is modified by a voltage monitor 78 all of which is contained within proximity sensor assembly 14. A pulse stretcher 79 increases the duration of signals generated by the voltage monitor 78. Likewise, the electrical signals from film presence sensors 74 and film motion sensors 76 are fed into a time delay circuit 80 and a speed sensing/time delay circuit 81 respectively, which modify the signals for use by a relay driver 82. Relay driver 82 produces output signals which are used to control relays 84.

Figure 9:
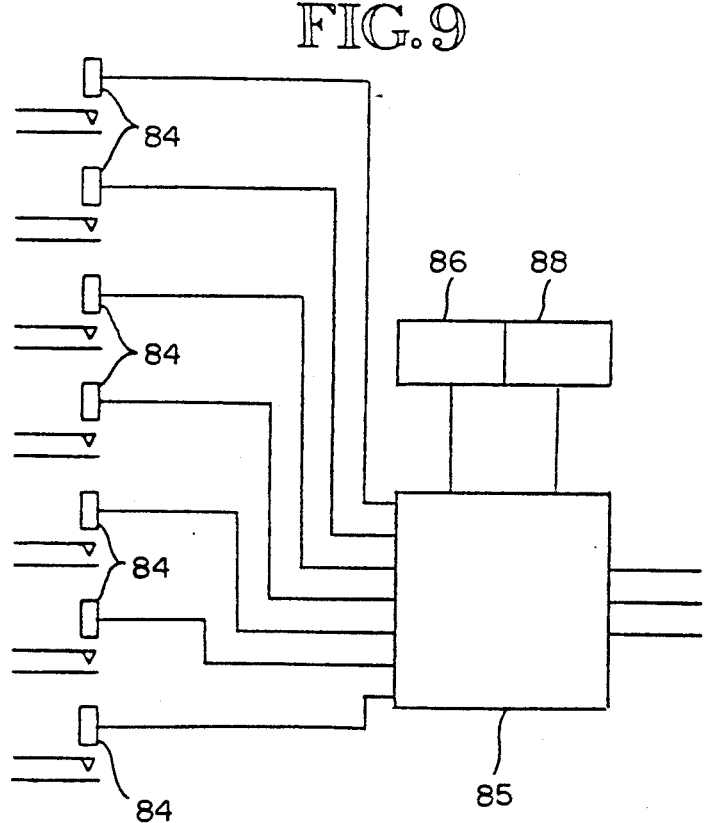
FIG. 9 is an electrical schematic representation of a second embodiment for cue expansion.

FIG. 9 is a representation of a preferred embodiment having a cue expansion circuit 85, otherwise known as an eight bit addressable latch decoder or the like, which expands the three input signals of varying numbers and positions to form the seven function output plus a zero node which then produces eight output states. Used in conjunction with the expansion circuit 85 is an input timer 86 which acts to preclude a second signal which may have been erroneously generated for an adjustable period of time, and a pulse stretcher 88 which is similar to pulse stretcher 79 serving to increase the length of an electrical signal with regard to its total time pulse. The expansion circuit (not shown) produces signals for controlling relays 84 which may be of various types.

From the foregoing, there are further modifications, component arrangements, and modes of utilization of the invention which will be apparent t those skilled in the art to which the invention is addressed. The scope of protection is not to be limited by the details of the embodiments which have been illustrated and described. Rather, the scope of protection is to be determined by the appended claims, interpreted in accordance with the established rules of patent claim interpretation, including the Doctrine of Equivalents.

INDUSTRIAL APPLICABILITY

This invention finds application in the projection of motion picture films. In particular, it allows the projector and associated peripheral equipment to be automatically controlled by cues placed on the film and by sensing presence of the film in the film path and motion of the film in the film path. Peripheral equipment that may be controlled by this invention includes such items as the house lights, curtains, projector settings, sound system settings and allows for the remote monitoring of the system.

I claim:

1. A cue sensor assembly for detecting at least one cue located in one of generally three transverse positions on a portion of film, said transverse positions being adjacent a left edge, adjacent a right edge and generally centered between the right and left edges, said cue sensor assembly comprising:
   a film support roller having an axis of rotation perpendicular to a film path; and,
   a plurality of cue sensors is positioned in an manner as to sense a cue placed adjacent the right edge of the film, and a second sensor is positioned in a manner as to sense a cue placed generally centered between the right and left edges of the film, and another sensor positioned in a manner as to sense cue placed on the left edge of the film, and, wherein said cue sensors are operated at different frequencies preventing electrical disturbances between adjacent sensor.

2. A cue sensor assembly according to claim 1, wherein each of said cue sensors is a proximity sensor of the eddy current killed oscillation type.

3. A film monitor, for use in automating motion picture presentation, that senses cues positioned on a film being projected, senses the presence of film in a projector and senses motion of the film through the projector, said monitor comprising;
   a plurality of film support guide rollers;
   a plurality of proximity sensors positioned adjacent to one of said guide rollers, each said sensor being capable of detecting one of said cues;
   an optical film presence detector positioned adjacent to one of said guide rollers;
   a film motion detector of an optical type positioned adjacent one of said guide rollers; and
   an electronic circuit for processing electrical input signals produced by said sensors, and producing an electrical output signal related to said input signals for controlling the projector and peripheral equipment.

4. A film monitor according to claim 3, wherein said plurality of film support guide rollers includes a first film contacting roller, a proximity sensor guide roller, and an optical sensor roller, each roller having a rotational axis, each rotational axis being in parallel relationship with each other for supporting said film in a film transport plane that is perpendicular to said rotational axis.

5. A film monitor according to claim 4, wherein said cue sensing roller includes outer shoulder portions for guiding edge portions of said film, a pair of film support ridges located on said roller for supporting said film at a location adjacent to edge perforations in said film, and having a pair of dirt collection grooves located adjacent each edge of said film, wherein said roller is supported for rotation about an axial shaft by a pair of anti-friction bearings.

6. A film monitor according to claim 3, wherein said optical sensing roller includes a pair of transversely extending shoulders for guiding edge portions of said film, a pair of film supporting surfaces positioned adjacent t edge perforations in said film, and having a groove extending transversely below said film support surfaces, and a small diameter center portion adjacent to a center portion of said film.

7. The film monitor according to claim 3, wherein each of said proximity sensors is of the eddy current killed oscillation type, said sensors being positioned in a substantially common plane and each sensor having a different operating frequency than an adjacent sensor thereby preventing any electrical interference from said adjacent sensor.

8. A film monitor according to claim 3, wherein said film presence sensor includes a pair of optical instruments, each optical instrument having a light emitting source and a light receiving portion whereby when said film is positioned between said film presence sensor and one of said rollers, that said light emitted is reflected by said film and received by said light receiving potion of said sensor such that said sensor produces an output signal when said film is present.

9. A film monitor according to claim 3, wherein said film motion sensor includes a pair of spaced apart light emitters and a pair of spaced apart light sensors, said light emitters and said light sensors each being spaced above perforations in the film such that when the film is moving, light emitted from the light source is alternately reflected by the film and passes through perforations in the film such that the light receiver alternately receives reflected light and then does not thereby producing a pulsed signal when said film is moving.

10. The film monitor according to claim 3, wherein each of said proximity sensors is of the eddy current killed oscillation type, said sensors being positioned in a substantially common plane and each sensor having a different operating frequency than an adjacent sensor thereby preventing any electrical disturbance from said adjacent sensor.

11. A film monitor according to claim 3, wherein said film presence sensor includes a pair of optical instruments, each optical instrument having a light emitting source and a light receiving portion whereby when said film is positioned between said film presence sensor and one of said rollers, that said lights emitted is reflected by said film and received by said light receiving portion of said sensor such that said sensor produces an output signal when said film is, present.

12. A film monitor according to claim 3, wherein said film motion sensor includes a pair of spaced apart light emitters and a pair of spaced apart light sensors, said light emitters and said light sensors each being spaced above perforations in the film such that when the film is moving, light emitted from the light source is alternately reflected by the film and passes through perforations in the film such that the light receiver alternately receives reflected light and then does not thereby producing a pulsed signal when said film is moving.

13. A method of controlling automated motion picture presentation in a motion picture projection system having a plurality of film support guide roller sensors associated therewith comprising the steps of:

passing a film with cues thereon across a film support roller past a cue detector whereby the presence of said cues is detected;

passing said film across a film support roller past a film presence detector whereby the presence or absence of film is detected;

passing said film across a film support roller past a film motion detector of an optical type whereby motion of said film is detected;

processing signals from each of said detectors to produce an electrical output signal related to said signals for controlling the projector and peripheral equipment.

14. The method of claim 13 wherein separate film support guide rollers are used for each detection step.

15. The method of claim 13 wherein said cue detector comprises an array of detectors positioned in a line perpendicular to the path of travel of said film and wherein said array comprises a plurality of proximity sensors of the eddy current killed oscillation type operated at discrete different operating frequencies to avoid electrical interference therebetween.

16. The method of claim 13 wherein said step of passing said film across a film support roller past a film motion detector of an optical type further comprises the steps of positioning optical instruments having a light emitting source and a light receiving portion whereby light emitted is reflected by said film and detected by said light receiving portion whenever said film is present.

17. The method of claim 13 wherein motion of said film is detected by positioning light emitters and light sensors at a location of perforation in said film such that when the film is moving, light from the light source is alternately reflected by the film and passed through the perforations producing a pulsed signal.

* * * * *